Figure 4:
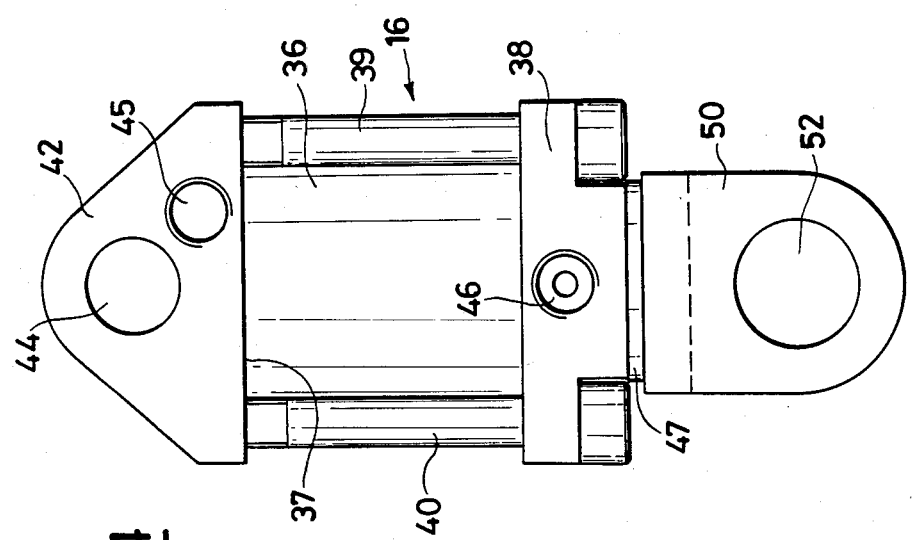

United States Patent [19]
Della Rocca

[11] Patent Number: 4,742,758
[45] Date of Patent: May 10, 1988

[54] SELF-LOCKING, FLUID OPERATED ACTUATOR

[75] Inventor: Francesco Della Rocca, Pomigliano d'Arco, Italy

[73] Assignee: Alfa Romeo Auto S.p.A., Naples, Italy

[21] Appl. No.: 94,085

[22] Filed: Sep. 4, 1987

Related U.S. Application Data

[63] Continuation of Ser. No. 796,412, Nov. 8, 1985, abandoned.

[30] Foreign Application Priority Data

Nov. 19, 1984 [IT] Italy .............................. 23652 A/84

[51] Int. Cl.[4] .......................................... F15B 15/26
[52] U.S. Cl. ................................... 92/24; 91/43; 91/44; 92/27; 92/118
[58] Field of Search ................. 92/23, 24, 27, 28, 118; 91/43, 44

[56] References Cited

U.S. PATENT DOCUMENTS

| | | | |
|---|---|---|---|
| 2,660,028 | 11/1953 | Geyer | 92/27 |
| 3,605,568 | 9/1971 | Nepp | 92/24 |
| 3,946,642 | 3/1976 | Bogenschutz | 92/24 |
| 4,076,208 | 2/1978 | Olson | 92/27 |
| 4,080,875 | 3/1978 | Repolovsky | 92/63 |
| 4,167,891 | 9/1979 | Kaminura | 92/24 |

FOREIGN PATENT DOCUMENTS

| | | | |
|---|---|---|---|
| 1426552 | 11/1968 | Fed. Rep. of Germany | 92/24 |
| 197709 | 9/1977 | U.S.S.R. | 92/27 |

*Primary Examiner*—Abraham Hershkovitz
*Attorney, Agent, or Firm*—Charles E. Brown; Charles A. Brown

[57] ABSTRACT

The present invention relates to a fluid-operated actuator, constituted by a cylinder and by a double-effect piston, provided with a device suitable to automatically locking the same piston at the end of its working stroke.

3 Claims, 4 Drawing Sheets

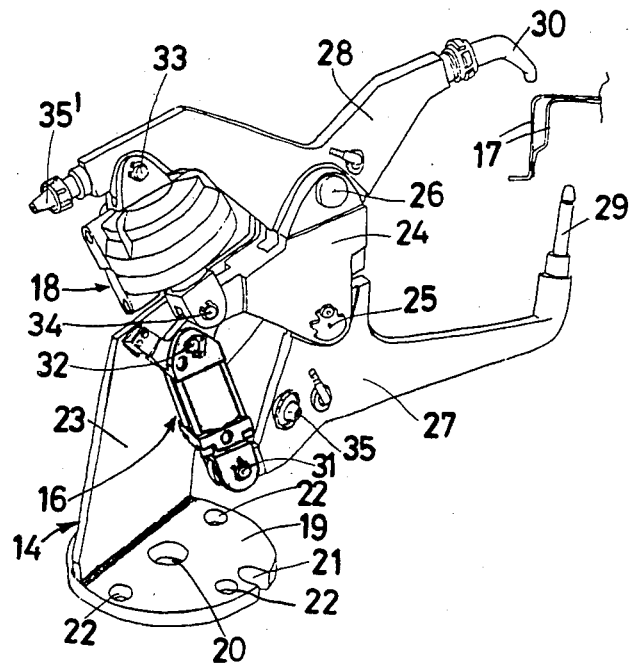
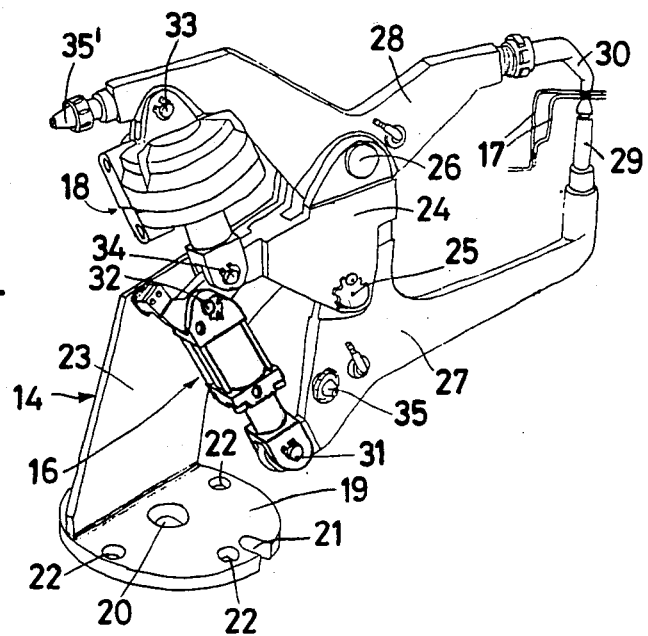

SELF-LOCKING, FLUID OPERATED ACTUATOR

This application is a continuation of Ser. No. 796,412, filed Nov. 8, 1985, now abandoned.

The present invention relates to a fluid-operated actuator, constituted by a cylinder and by a double-effect piston, provided with a device suitable to automatically lock the same piston at its working stroke end.

In the automated production plants fluid-operated actuators are commonly used to actuate the tools used in the different operations of the production cycle.

In many cases, the rolls and the related actuators are protrusively supported by the mechanical arms providing for their positioning; so, actuators with low weight and overall dimensions are requested, capable of moving at the highest speed, but also suitable to support high loads.

The solution of the problem is not easy in that, to the purpose of increasing the actuator's load supporting capacity, its dimensions should be increased, with the working fluid pressure remaining the same, and that to the detriment of its weight, overall dimensions, moving fastness characteristics.

Purpose of the present invention is solving the said problems, by accomplishing a fluid-operated actuator provided with a high load-supporting capacity, obtained without significant dimensional increases.

These and further purposes according to the present invention are achieved by accomplishing an actuator constituted by a cylinder, closed at its ends by respective heads, by a double-effect piston, sliding under tightness conditions inside the same cylinder, wherein it defines a first and a second chamber of variable volume, said cylinder being provided with a first and a second port for the passage of pressurized fluid, communicating with the said variable volume chambers, with the said piston a stem being solid, passing through one of the said heads, and operatively linked to the tool to be actuated, the said cylinder too being operatively linked to the tool to be actuated, the actuator being characterized in that it comprises also a locking device operatively linked to means suitable to engage it with and disengage it from said piston, under control, when the said piston is in its wotking stroke end position.

According to a preferred embodiment, the said piston has an annular shape, the said stem has a hollow cylindrical shape, and both of them are slidingly mounted on an inner-guide sleeve, fastened on to a head of the cylinder, the actuator comprising also a shutter provided with a stem and a small piston respectively sliding inside said sleeve and inside said hollow stem, the said stem being provided with a duct to convey pressurized fluid towards a face of said piston, the said sleeve being provided with a port for the feeding of the pressurized fluid to said stem, which is provided in its turn with a respective duct to convey pressurized fluid on to the other face of the said small piston, the said locking device being in engagement relationship with said sleeve and with the stem of the said shutter.

The said locking device is preferably constituted by balls supported within a cage provided in the said sleeve, and by a first annular channel provided in the inner annular wall of said piston, a second annular channel and track being both provided in the stem of said shutter, the said balls being in engagement relationship with said second channel in the resting position, when said piston is in its working stroke beginning position, and being pushed into said first channel by the said track of the shutter's stem, under active condition, when the said piston is in its working stroke end position.

So, under the condition of actuator's maximum extension, a mechanical lock occurs of the piston relatively to the cylinder, and this allows the same actuator to withstand peak loads of considerable magnitude.

Characteristics and advantages of the invention are now illustrated with reference to the hereto attached FIGS. 1-6, wherein a preferred embodiment of the same invention is represented to non limitative exemplifying purposes.

Figure 1:
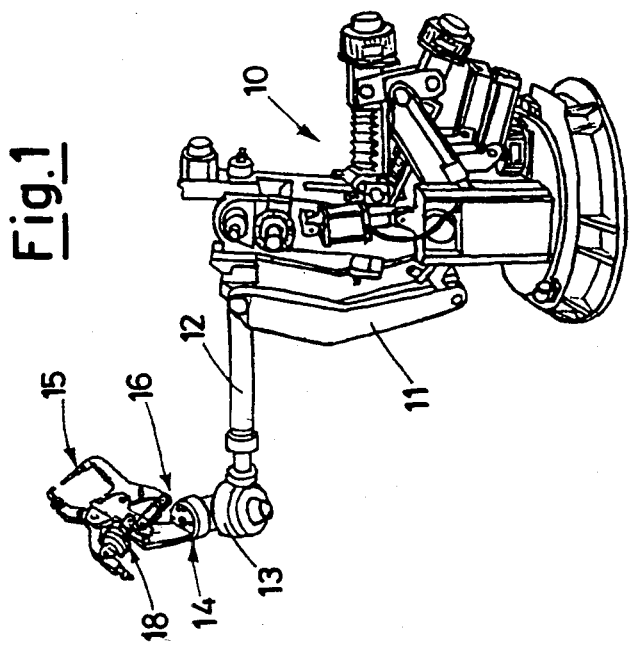
Figure 5:
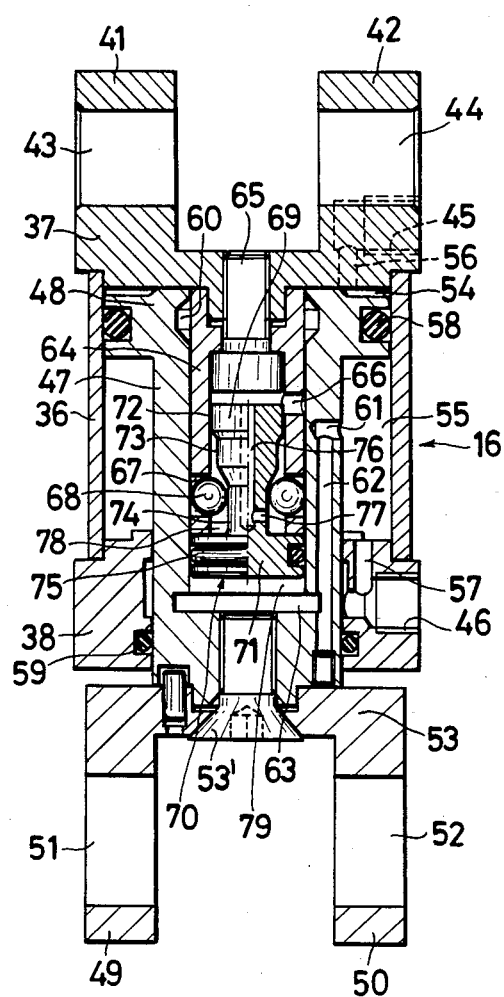
Figure 6:
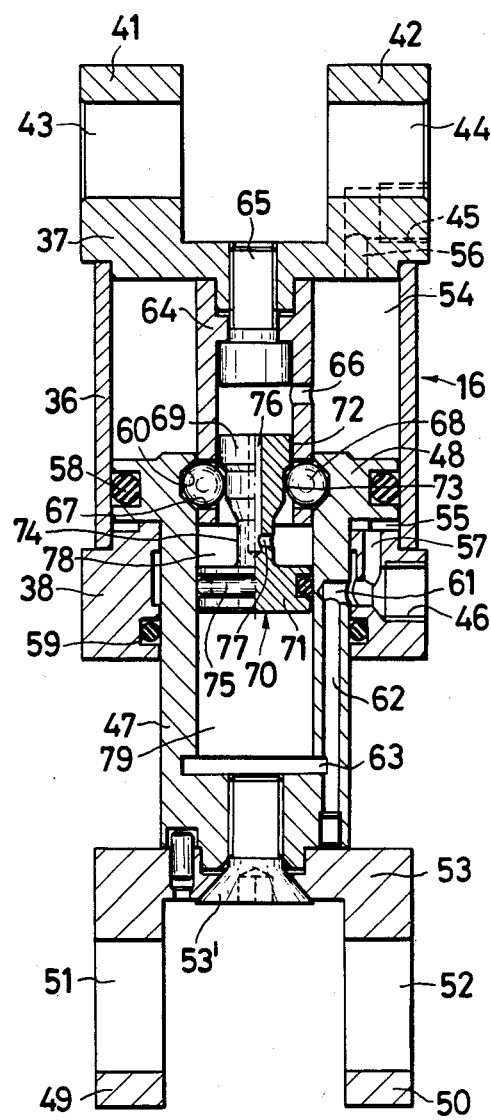

FIG. 1 is a perspective view of the arm of a robot for the driving of a welding pincers, provided with the actuator according to the invention, FIGS. 2 and 3 are perspective views, on an enlarged scale, of the pincers and of the related actuator, as represented in FIG. 1 in different operating stages, FIG. 4 is an enlarged side view of the actuator according to the invention as shown in FIGS. 2 and 3;

FIG. 5 is a sectional view of the same actuator, according to the path plane V—V of FIG. 4; and FIG. 6 is a sectional view of the actuator of FIG. 5 in its working position.

In FIG. 1 with 10 a robot is generally indicated, not described in detail, in that it is of known type; the robot is provided with two arms 11 and 12, and with a wrist 13, to which an "L"-bracket 14 is fastened, supporting a welding pincers 15 and the relating actuators 16 and 18.

FIGS. 2 and 3 show the welding pincers 15 respectively in its resting condition and in its working condition, in the operation of spot-welding of a metal sheet 17.

A wall 19 of the bracket 14 is provided with a centering bore 20, with a control bore 21, and with bores 22 for the bolts for its fastening to the wrist 13.

On to a wall 23 of the bracket 14 a support 24 is fastened, on to which the arms 27 and 28 of the welding pincers 15, bearing the electrode tips 29 and 30 are hinged in 25 and 26.

To the arms 27 and 28 connectors 35 and 35' are fastened, for the connection to the transformer, not shown, feeding the electrodes 29 and 30.

The actuator 16, which carries out the partial closure of the pincers 15, by opening wide apart the arm 27, is formed by a cylinder and by a pneumatically actuated piston (which can be seen in FIGS. 4–6), which are hinged on to the arm 27 in 31, and on to the wall 23 in 32.

The actuator 18, which carries out the complete closure of the pincers 15, by opening wide apart the arm 28, is formed by a pneumatically actuated piston, of known type, and hence not shown, which are respectively hinged on to the arm 28 in 33 and on to the wall 23 in 34.

In FIG. 4, the actuator 16 comprises a cylinder 36 and two heads 37 and 38 which close the ends of the same cylinder, assembled by means of bolts, ad 39 and 40.

The head 37 is provided with flanges 41 and 42 which by bores 43 and 44 are connected to the stud 32 and to the wall 23 of the bracket 14, shown in FIGS. 2 and 3.

In the head 37 a threaded bore 45 is provided for a joint, not shown, feeding compressed air to the actuator 16.

In the head 38 a threaded bore 46 is provided for the joint, it too not shown, for a second inlet for a second compressed air supply inlet to the actuator 16.

With 47 the stem is indicated of a piston 48 (visible in FIGS. 5 and 6) sliding under tightness conditions in the cylinder 36; on to the stem 47 a fork 53 is fastened, provided with flanges 49 and 50 which are linked to the pin 31 and to the arm 27 of the pincers 15 by means of the bores 51 and 52.

As it results from FIGS. 5 and 6, the piston 48 is essentially of annular shape and its stem 47 is of hollow cylindrical shape, closed at its outer end by a threaded plug 53', which renders the fork 53 solid with the same stem 47.

The piston 48 divides the inside of the cylinder into two chambers of variable volume 54 and 55, the one connected to the bore 45 through a passage 56, the other connected to the bore 46 through a passage 57.

With 58 and 59 sealing rings respectively of the piston 48 and of the stem 47 are indicated.

In the inner annular wall of the piston 48 an annular channel indicated with 60 is provided, and in the stem an annular bore 61 and a duct 62 are provided and communicate with the inside of the stem 47 through a port 63. Inside the cylinder 36 a sleeve 64 is provided, which is fastened to the head 37 by a bolt 65; the sleeve acts as an inner guide for the piston 48 and for its stem 47.

The wall of the sleeve 64 is provided with a wall 66 and is provided with slots 67 inside which balls 68 are housed.

Inside the sleeve 64 a stem 69 of a shutter 70 is positioned, also provided with a small piston 71; inside the stem 69 ducts 76 and 77 are provided. The stem 69 has a shaped profile and is provided with an annular prominent portion 72, an annular track 73 and an annular channel 74, provided with a conical wall of connection to the track 73. The small piston 71 can slide inside the stem 47, with a sealing ring 75 being interplaced between the two.

In FIG. 5 the actuator is shown with its piston 48 in its working stroke beginning position; in FIG. 6 the actuator is shown on the contrary in its condition of greatest extension, with the piston 48 being in its position of working stroke end.

As it was previously mentioned, the function of the actuator 16 is of partially closing the pincers 15; to this purpose, pressurized air also containing lubricant is sent through the bore 45 and the passage 56 to the chamber 54, so that the piston 48 may slide relatively to the cylinder 36, opening wide apart the arm 27 of the pincers 15, and approaching the electrode 29 to the metal sheets 17.

With the shifting of the piston 48 the port 66 of the sleeve 64 is uncovered, and pressurized air reaches the stem 69 of the shutter 70; through the ducts 76 and 77, the air reaches the chamber 78 and actuates the small piston 71 to slide inside the stem 47.

When the annular track 73 of the stem 69 comes in front of the balls 68, it exerts on them an action thrusting them outwards, causing them to enter the channel 60, which is aligned with the same balls, when the piston 48 is in its position of working stroke end, as shown in FIG. 6.

Under this condition, the piston 48 remains locked in its position of greatest extension relatively to the cylinder 36 and also the arm 27 of the pincers 15 is firmly kept in its working position, so that it can support also high-value loads.

In the mean time, the actuator 18 opens wide apart the arm 28 of the pincers, to bring also the tip of the electrode 30 in contact with the metal sheets 17.

After that the welding operation has been carried out, the arms 27 and 28 of the pincers are driven to open by the respective actuators 16 and 18.

The unlocking of the actuator 16 is obtained by means of the feeding of compressed air through the bore 46, because through the duct 62 and the opening 63, the same air reaches the chamber 79 and the small piston 71 of the shutter 70, which it pushed towards the end of the sleeve 64, leaving the balls 68 free to re-enter the channel 74.

The piston 48, not any longer retained by the balls 68, can freely move under the action of the compressed air, which penetrates into the chamber 55 through the passage 57 and pushes it towards its working stroke beginning position as shown in FIG. 5.

It should be noted how, by this particular embodiment, by the shutter 70 being positioned inside the stem 47, also minimizing the actuator's overall dimension has been possible.

I claim:

1. Self-locking fluid-operated actuator for the driving of tools for mechanical operations, said actuator comprising a cylinder having ends closed by respective heads, a double acting working piston sliding under tightness conditions inside said cylinder wherein it defines a first and a second chamber of varible volume, said cylinder being provided with a first and a second port communicating with said variable volume chambers for the passage of pressurized fluid, a stem solid with said working piston and passing through one of said heads, said stem being operatively linked to a tool to be actuated, said cylinder being operatively linked to a tool to be actuated, said actuator being improved by a locking device carried by the other of said heads within said piston and stem operatively linked to actuator means for engaging said locking device with said working piston, under control, when said working piston is in an extended working position to lock said working piston in said extended working position, said actuator means including a control piston, fluid passage means for directing fluid under pressure to act on said control piston to engage said locking device, and said working piston forming valve means for controlling flow of fluid under pressure through said fluid passage means to said control piston whereby said working piston forms control means for actuating said locking means as said working piston advances towards said extended working position.

2. Self-locking fluid-operated actuator for the driving of tools for mechanical operations, said actuator comprising a cylinder having ends closed by respective heads, a double acting working piston sliding under tightness conditions inside said cylinder wherein it defines a first and a second chamber of variable volume, said cylinder being provided with a first and a second port communicating with said variable volume chambers for the passage of pressurized fluid, a stem solid with said working piston and passing through one of said heads, said stem being operatively linked to a tool to be actuated, said cylinder being operatively linked to a tool to be actuated, said actuator being improved by a locking device carried by the other of said heads within said piston and stem operatively linked to actuator means for engaging said locking device with said working piston, under control, when said working piston is in an extended working position to lock said working piston in said extended working position, said piston being annular, said stem being of hollow cylindrical shape, said locking device including an inner guide sleeve carried by said other head, both said piston and said stem being mounted for sliding on said inner guide sleeve, said actuator means comprising a shutter provided with a stem and a control piston respectively sliding inside said guide sleeve and inside said hollow stem, said shutter stem being provided with a duct for conveying pressurized fluid operable to advance said control piston in a direction away from said working piston, said guide sleeve being provided with a port for the feeding of pressurized fluid to said shutter stem, said hollow stem having a duct for conveying pressurized fluid operable to advance said control piston to said working piston, said locking device including locking elements in engagement relationship with said sleeve and with said shutter stem for movement by said shutter into locking engagement with said working piston.

3. An actuator according to claim 2, characterized in that said locking elements are balls supported in a cage provided in said sleeve for reception in a first annular channel provided in an inner annular wall of said working piston, a second annular channel and track being provided on said shutter stem, said balls being in engagement relationship with said second channel in a resting position when said working piston is in its working stroke beginning position and being pushed into said first channel into a locking position by said shutter being moved by said control piston when said working piston is in said extended working position.

* * * * *